United States Patent [19]

Roch et al.

[11] 4,084,424
[45] Apr. 18, 1978

[54] TWIN MOTOR AND SCREW DRIVE FOR WORKPIECE POSITIONING STOPS AND FOR PRESS RAM DRIVE AND THE LIKE

[75] Inventors: Gerald V. Roch; Chris L. Hadley, both of Indianapolis, Ind.

[73] Assignee: Hurco Manufacturing Company Inc., Indianapolis, Ind.

[21] Appl. No.: 712,236

[22] Filed: Aug. 6, 1976

Related U.S. Application Data

[62] Division of Ser. No. 630,011, Nov. 7, 1975.

[51] Int. Cl.² .................... B21D 11/22; B21D 7/06
[52] U.S. Cl. ................................... 72/389; 72/461
[58] Field of Search .............. 72/389, 461, 36, 454, 72/7, DIG. 21

[56] References Cited

U.S. PATENT DOCUMENTS

| | | | |
|---|---|---|---|
| 2,627,890 | 2/1953 | Lloyd | 72/389 |
| 3,260,087 | 7/1966 | Guarino | 72/36 |
| 3,618,349 | 11/1971 | Roch | 72/389 |
| 3,820,377 | 6/1974 | Roch | 72/461 |
| 3,826,119 | 7/1974 | Marotto | 72/36 |

FOREIGN PATENT DOCUMENTS 2,017,420  2/1972  Germany .............................. 72/7

Primary Examiner—C.W. Lanham
Assistant Examiner—Gene P. Crosby
Attorney, Agent, or Firm—Woodard, Weikart, Emhardt & Naughton

[57] ABSTRACT

A rear gauge assembly includes a gauge bar extending between two carriages, each carriage being mounted to a housing mounted to the rear of a press brake bed and having a lead screw and motor associated with it. Front gauges are provided on carriages on a pair of similar housings mounted to a rail mounted to the front of a press brake bed, each of these housings also having a lead screw and motor for driving its respective carriage. A microcomputer is employed to control the two motors for synchronizing movement of the rear gauge carriages with each other while driving the rear gauge, and to control the two motors for the front gauge while the front gauges are being driven to synchronize movement of front gauges with each other. The same synchronizing techniques for two lead screws are employed on a new type of ram drive for press brakes incorporating two ram drive screws, with a motor for each screw, the motors being synchronized by the controller.

19 Claims, 13 Drawing Figures

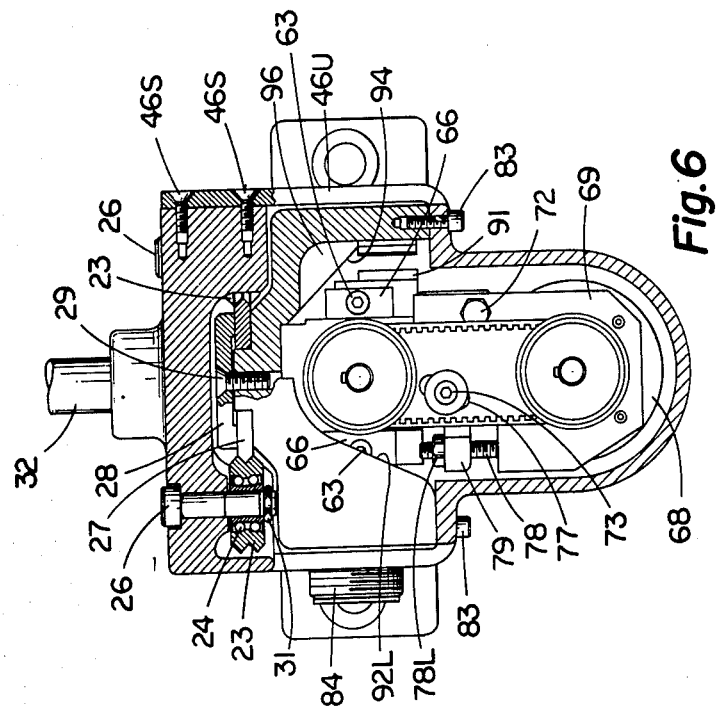
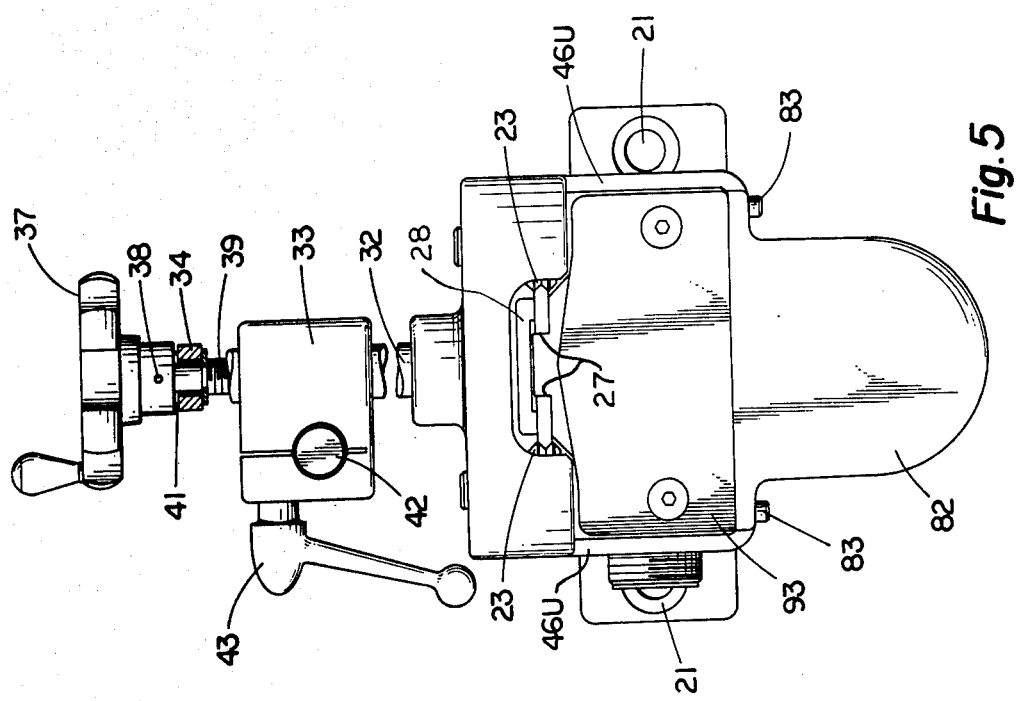

TWIN MOTOR AND SCREW DRIVE FOR WORKPIECE POSITIONING STOPS AND FOR PRESS RAM DRIVE AND THE LIKE

This is a division of application Ser. No. 630,011, filed Nov. 7, 1975.

BACKGROUND OF THE INVENTION

1. Field of the Invention

This invention relates to press brakes and to workpiece locating or positioning stops or gauges for press brakes and the like.

2. Description of the Prior Art

The U.S. Pat. No. 3,618,349, issued Nov. 9, 1971 to Gerald V. Roch, for a gauging system for presses, discloses a system for operating front and rear gauges in a predetermined sequence automatically. One of the references cited in that patent was U.S. Pat. No. 3,176,556 to Roberts, describing a tape-controlled lead screw drive for the back gauge of a guillotine-type shearing machine. U.S. Pat. No. 3,826,119 issued July 30, 1974, shows a rear gauge driven by a lead screw.

Although there are situations where a rear gauge bar is short enough that a single point of drive for it is suitable, there are many instances when, due to the substantial length of the gauge bar, drive for it must be provided in at least two horizontally spaced points along its length. The above-mentioned Roch patent provides for this by using a pair of horizontally spaced cylinders for driving the rear gauge. U.S. Pat. Nos. 1,366,409 issued Jan. 25, 1921, and 3,115,801 issued Dec. 31, 1963, show rear gauges for metal shearing machines and which employ screw drives at spaced points, the earlier patent showing two handwheels, one for each screw, and the other showing a single handwheel with a cross-shaft for driving the two screws. Rear gauges using twin screw drives with a single motor driving the two screws, one of them by means of a cross-shaft, have been advertised by the organization named "Colly Constructions Hydromechaniques" of Lyon-Villeurbanne, France. Its advertisement said the apparatus could provide for eight successive bends preselected manually by means of eight sets of digital switches.

A press brake rear gauge apparatus having two drive screws and motors has been advertised by the Niagara Machine and Tool Works of Buffalo, N.Y. It was referred to as the "Bend-A-Matic" and was intended to employ digital switches as in the aforementioned Roch patent for preselection of gauge stopping positions, together with an integrated solid state circuit control. It was said to be programmable for three different bend dimensions, each to be established by adjusting certain switches in three sets of digital switches, one set for each of the bend dimensions. There was no provision for alternate operation of front or rear gauges.

There has remained a need for greater versatility in terms of the number of pre-selectable bend dimensions, the facility of switching from front gauge to rear gauge operation and vice versa, convenience of mounting and relocation of gauging apparatus on the press brake, high speeds, low cost, and minimal danger of overloading the gauges themselves or the drives for them.

According to one embodiment of our invention, a basic carriage mounting frame and drive motor are employed for the front gauges and the rear gauges. A microprocessor is employed in a microcomputer to facilitate entry of dimensional data, bend sequence instructions, correction factors, and control operation of drive motors for lead screws driving either a pair of front gauges, or a rear gauge having twin lead screw drive. Although it is known to employ a computer to control relative speeds of feed rolls in papermaking and handling machines, and also to control drive motors at opposite ends of long overhead gantry cranes, we do not know what specific techniques were used in implementing such controls. Integrated circuit logic has also been used for control of independent motors driving equipment at different points but in synchronism in terms of time and direction. Control Systems Research has done considerable work in synchronization control of shafts by phase locking methods.

Cambion has introduced numerical control equipment for point to point movement of workpiece support tables for machine tools, but we do not believe that their literature has ever referred to control of twin parallel synchronized drives or twin lead screws associated with their controllers. They employed stepping motors. It is believed also that twin lead screw drive has been done by C. Behrens of Alfeld, Germany, employing a single motor and some kind of numerical control for clutches to synchronize the drive of the two lead screws with only the one motor. It is described in U.S. Pat. No. 3,650,133. Further details are unknown to us. We are unaware of any use heretofore of a microcomputer or microprocessor in the control of two parallel drives for a single item.

SUMMARY OF THE INVENTION

Described briefly, in one embodiment of the present invention, a basic frame and carriage drive assembly is provided for use with either rear gauges or front gauges. It employs a top-mounted dual vee carriage way, with one carriage configuration for a rear gauge, and another for a front gauge. A dual vee rail mounting is used for the front gauge frames. Each drive assembly includes a motor and screw.

For front gauging, there is usually a pair of separate front gauge members provided. For rear gauging, there is usually at least one gauge bar member connected to a pair of carriages. A pair of power drive motors connected to a pair of gauge carriages, with the points of connection to be moved in synchronism toward a predetermined stopping point or target position, is controlled by a microprocessor synchronizing the movement of the gauge carriages, recognizing the one which is farther from the target position as the master, and slaving the other to it, for drive of the connector points at high speed (800 inches per minute for example) in precise synchronization to a tolerance within 0.002 of an inch of each other during travel or traverse, for example, and within 0.001 of an inch of each other, for example, when traverse is stopped. In addition to controlling the drive motors for synchronization during travel, the connector points are to stop within 0.001 of an inch, for example, of the predetermined target position.

The microprocessor control prevents either drive motor from going into saturation, thus enabling the slave motor to be driven at higher accelerations, without overloading, in the event of detection of a correction signal requiring acceleration. As gauges reach a target point, the control changes operating mode so that each gauge drive servos to the predetermined gauge position independently of the other gauge motor. Also, when the gauge carriages are at rest, the control will cause the motor for one carriage, to drive it in response to a manual repositioning of the other carriage, to avoid structural damage, particularly where there is a gauge bar extending between the carriages as is usually the case for a rear gauge. Another safety aspect is that during carriage motion, if one strikes an abutment or is otherwise abruptly slowed or halted, the control will cause the other to halt or slow likewise, even if neither has reached the target position.

According to another feature of the invention, where both front gauges and rear gauges are used, while one set of gauges is in use for making a bend, the idle set is retracted a fixed amount and the position of the idle gauges is monitored so that, in the event they are inadvertently or intentionally jarred from position, the controller will take into consideration their misplacement at the beginning of the motion to the next predetermined position for them.

According to a further feature, accommodation can be made in the control for lead screws having one given lead for the rear gauges, and adapt the controller to control of front gauges having lead screws with a slightly different lead (within ±.016 inches maximum difference).

According to another feature of the invention, a pair of screws is employed to drive the ram of a press brake. These are driven by separate motors, controlled by a microcomputer for synchronization.

BRIEF DESCRIPTION OF THE DRAWINGS

FIG. 5 is a rear end view of the rear gauge drive and mount assembly.

FIG. 6 is a transverse section view illustrating some of the interior features of the rear gauge drive and mount assembly.

DESCRIPTION OF THE PREFERRED EMBODIMENT

Figure 1:
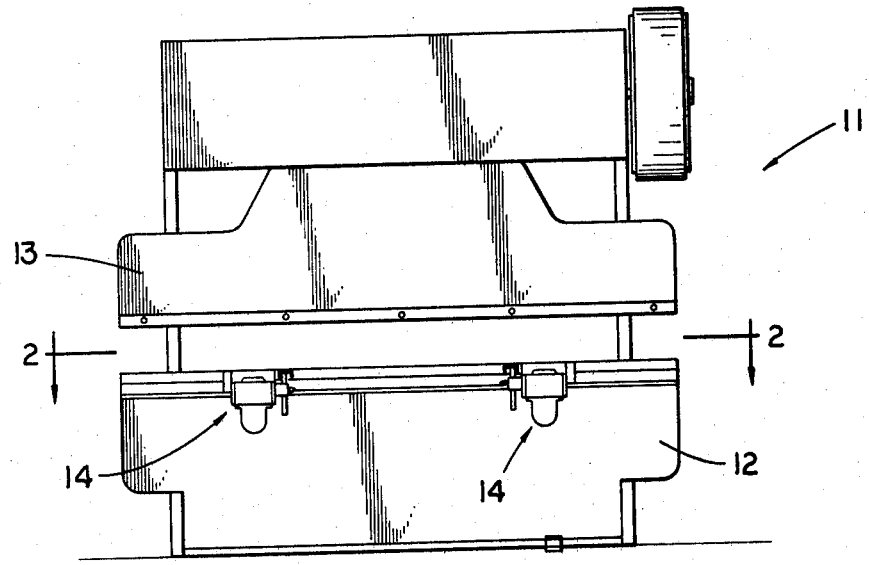
FIG. 1 is a simplified front view of a conventional mechanical press brake with the gauges of the present invention mounted thereto.

Referring now to the drawings in detail, FIG. 1 shows a press brake 11 having a bed 12, crank shaft driven ram 13, and front gauge housings 14 mounted to the front of the bed. The invention can be used with a hydraulically driven press brake.

Figure 2:
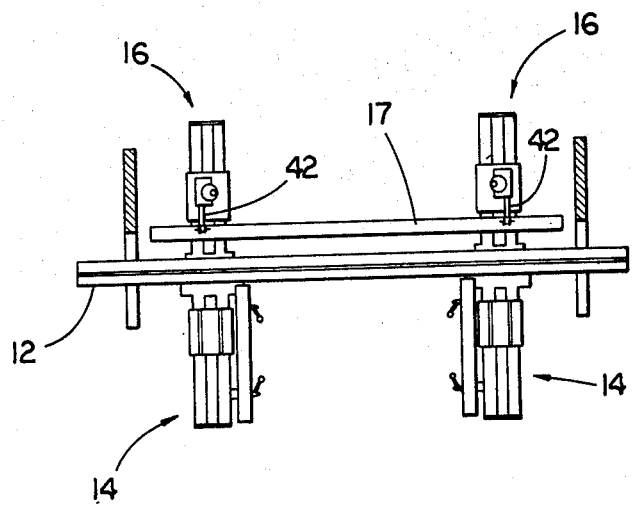
FIG. 2 is a simplified top plan view of the portion of the press brake below the ram of the press brake, showing the two front gauge drive housings and the two rear gauge drive housings.

FIG. 2 shows the same press brake in section as viewed from the top, the section being taken immediately above the lower die and wherein the twin mounts 16 for the rear gauge are shown mounted to the back of the bed 12. The rear gauge bar is shown at 17.

Figure 3:
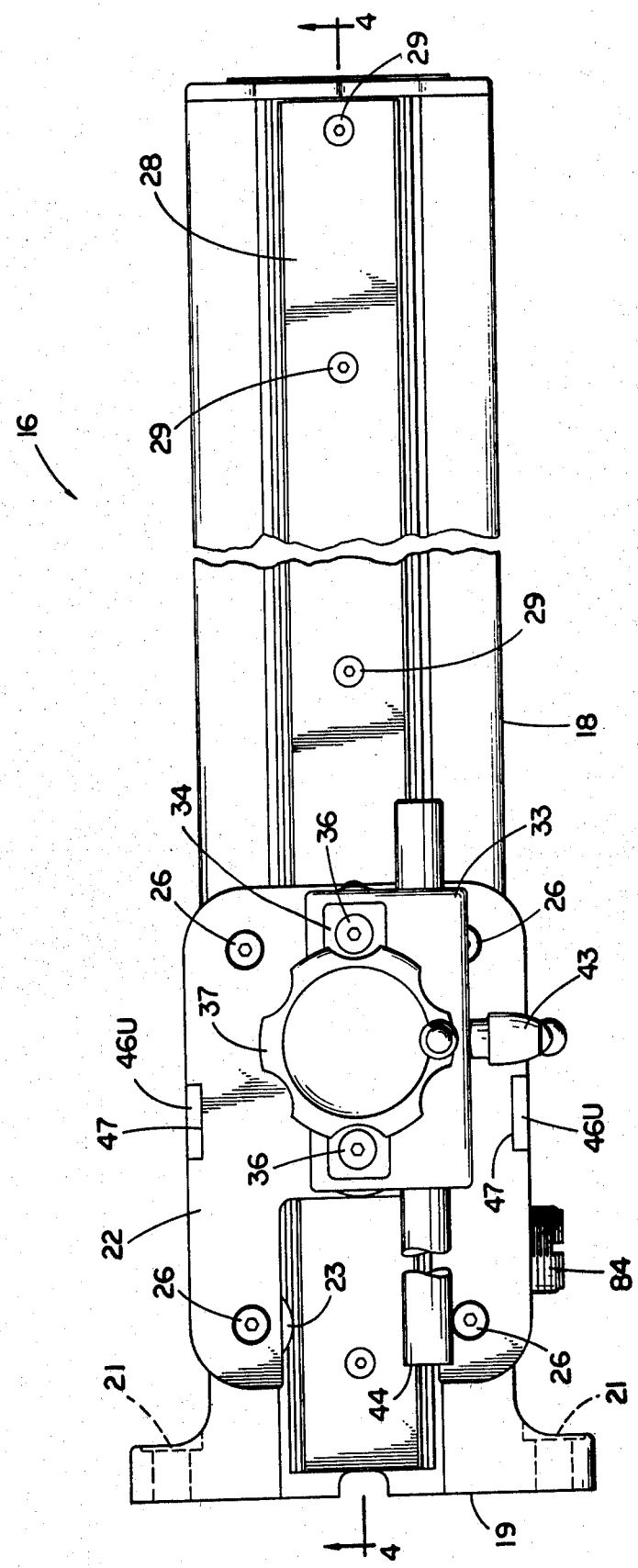
FIG. 3 is a top view of one of the rear gauge mount and drive assemblies.
Figure 4:
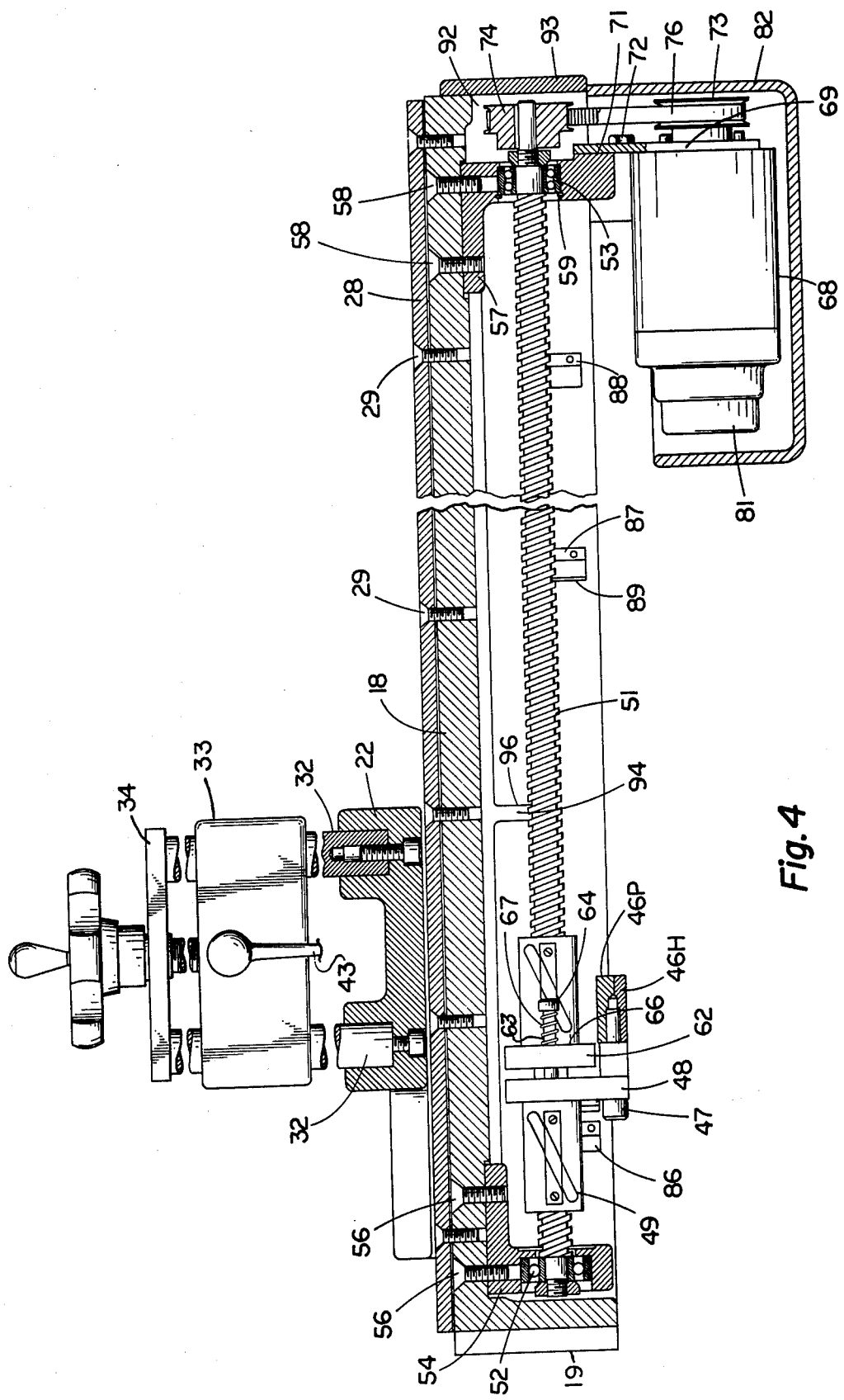
FIG. 4 is a section therethrough taken at line 4—4 in FIG. 3 and viewed in the direction of the arrows.
Figure 7:
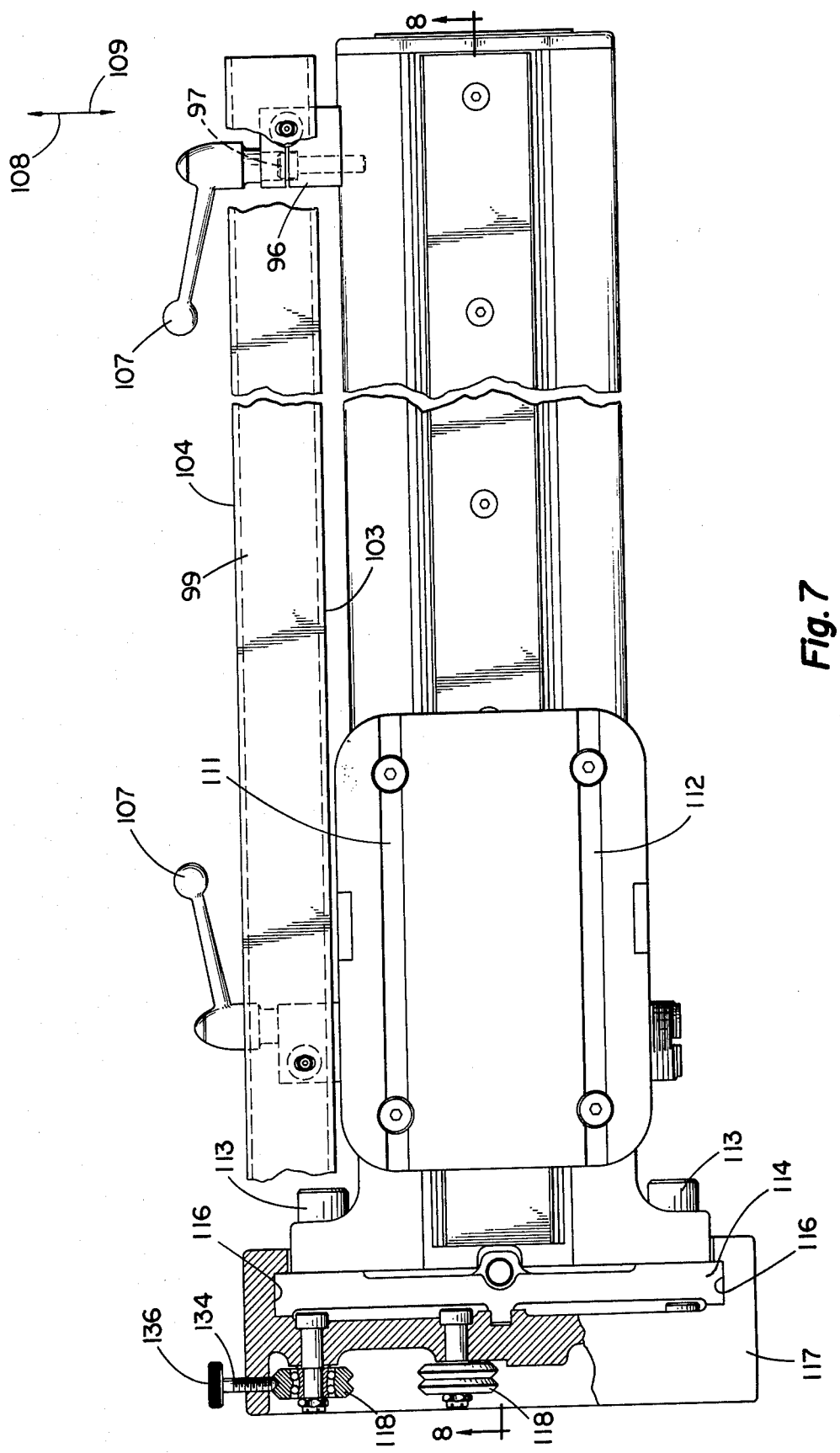
FIG. 7 is a top plan view of a front gauge mount and drive assembly.
Figure 8:
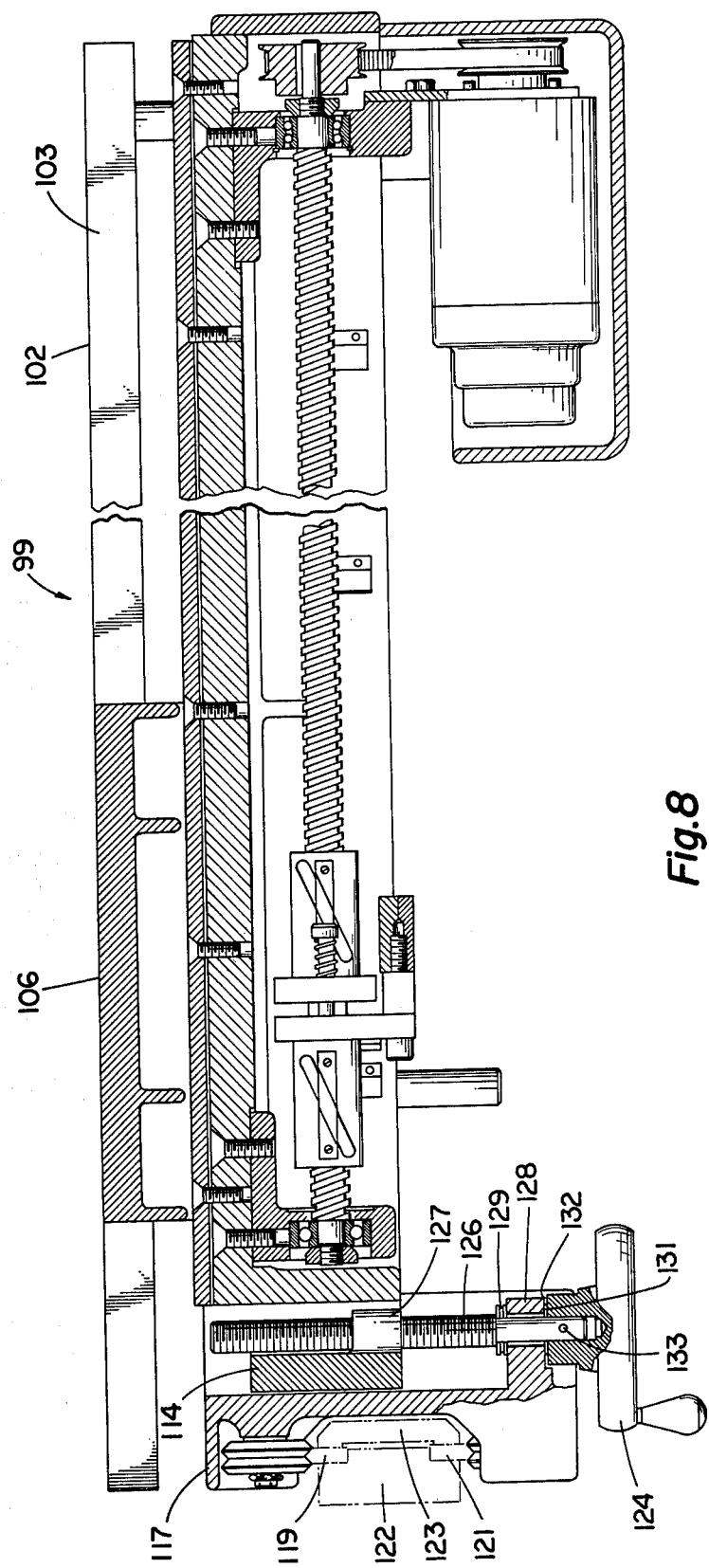
FIG. 8 is a section therethrough taken at line 8—8 in FIG. 7 and viewed in the direction of the arrows.
Figure 10:
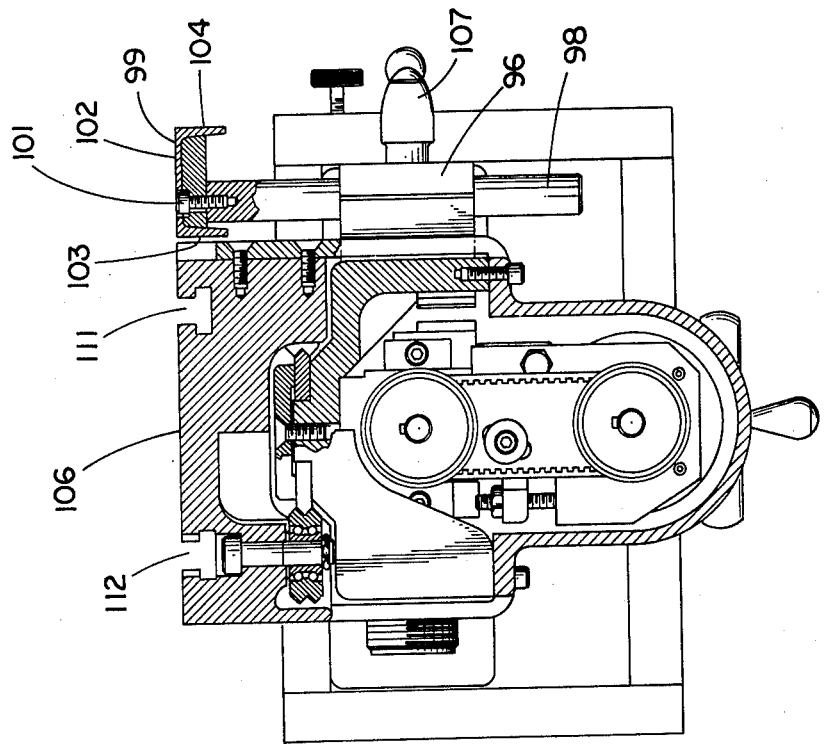
FIG. 10 is a typical transverse section therethrough showing interior details.
Figure 9:
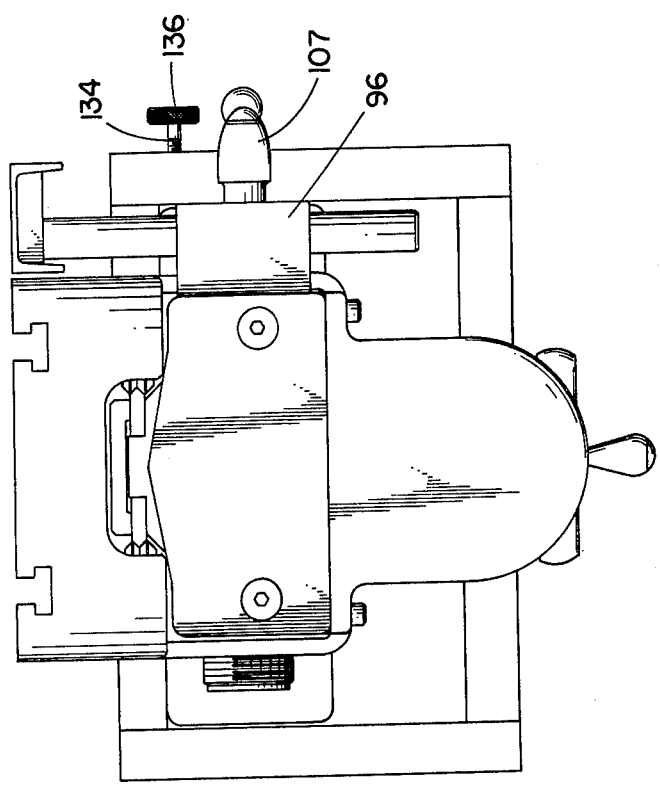
FIG. 9 is a front end view thereof.

Referring now to FIGS. 3 and 4, the drawings show one of the rear gauge mounts 16. This includes the main frame member 18 having a mounting face 19 at its left-hand end, with a pair of bolt holes 21 for receiving mounting bolts for attachment to the rear face of the press brake bed. The carriage 22 is mounted to the frame by means of a set of four double-vee carriage support and guide wheels 23 mounted by means of ball bearing assemblies 24 (best shown in FIG. 6) which are mounted to the four carriage mounting studs 26. Wheels 23 are guidingly received on carriage ways in the form of a pair of vee-way bars 27 received in the top of the main frame and clamped in place by means of the way-clamp 28 which is fastened to the main frame by means of the screws 29. The guide wheel bearings are secured on the studs 26 by means of flexible lock nuts 31, as shown in FIG. 6. Perhaps it would be well to mention at this point, that FIG. 6 is not representative of one particular cutting plane transverse of FIG. 3, but rather shows sections at various points to best illustrate interior features in a minimum of views.

Two support rods 32 are secured to the top of the carriage and receive the gauge bar support block 33 thereon. A cap 34 is secured to the top of these rods by a pair of screws 36. A support block elevating handwheel 37 is secured by a spring pin 38 to an adjusting screw 39 threadedly received in the support block 33. The lower face of the handwheel is received on a thrust bearing 41 supported on the cap 34. By turning the handwheel on its axis, the support block is raised or lowered. The gauge bar support rod 42 is clamped in the support block 33 by means of the handle 43. The gauge bar 17 (not shown in FIG. 3) is fastened to the front end 44 of the gauge bar support rod 42.

The carriage drive is provided by means which will now be described. Comparison of the FIGS. 3 through 6 will show a drive yoke which is a U-shaped member 46 having the upstanding arms 46 U thereof received in grooves 47 in the opposite sides of the carriage 22, and secured thereto by means of screws 46S. The horizontal portion 46H of the yoke extends across and under the bottom of the main frame and has a plate 46P welded to the top of it. This horizontal portion is drilled and tapped to receive a screw 47 by which a drive mounting bracket 48 is fixed to the yoke. A front ball-nut 49 is fixed to the drive mounting bracket 48.

The front ball-nut is received on a ball-screw 51 which is supported in ball bearing assemblies 52 and 53 near the front and rear ends, respectively, of the frame. Bearing 52 is mounted in the front end bearing bracket 54 affixed to the frame by a pair of screws 56. The bearing is press fitted into the bracket. Bearing 53 is received in the drive end bracket 57 secured near the rear end of the frame by means of the screws 58. The bearing is retained in the bracket by a bevelled snap ring 59. The bearings at the opposite ends have their inner races secured to the ball screw by means of bearing lock nuts and washers. A rear ball-nut mounted on plate 62 is also received on the ball screw. A shoulder screw 63 is threaded into the drive mounting bracket 48 and passes through the flange of ball-nut mounting plate 62. Between the screw head 64 and the rear face 66 of the ball-nut mounting plate 62, there is a spring 67 which provides a load urging the ball-nuts toward each other to end load the front ball-nut and avoid any end play of the front ball-nut with respect to the ball screw.

Drive for the ball screw is provided by means of a direct current (DC) servomotor 68 fastened to a motor mounting bracket 69 bolted to the rear face 71 of the drive end bracket 57 by means of bolts 72 and 73 (FIG. 6). A gear belt 76 passing between the motor pulley 73 and the ball screw pulley 74 provides the drive. The tension on belt 76 can be changed by pivoting the motor mounting bracket about the bolt 72 while the screw 73 is loosened and the slot 77 permits the pivoting motion. The screw 73 is then tightened to establish and maintain the adjustment. The adjusting screw 78, threadedly received in the ear 79 on the drive end bracket 57, facilitates the establishment of the desired belt tension, and a locknut 78L is provided on this screw. A rotary encoder 81 is mounted at the front end of the motor. A drive motor guard 82 is mounted to the main frame 18 by means of four cap screws 83. An electrical connector 84 is mounted to the side of the main frame.

There are three proximity switches 86, 87 and 88 mounted at spaced points along the length of the frame adjacent the drive screw. These are magnetic reed switches. An actuator 91 for these switches is secured to the drive mounting bracket 48 by a pair of screws. Switches 86 and 88 are mounted to the aluminum frame by aluminum mounting plates, while switch 87 is mounted by means of a steel plate and there is a switch shield associated therewith at 89 for good registry with the actuator for a purpose to be described later relating to the position marker for the encoder.

To further aid in the understanding of the drawing, perhaps it would be well to point out that the surface 92 in the drawing and covered by the end cap 93 in FIG. 5, is actually of the shape shown at the line 92L in FIG. 6. Similarly, the line 94 in FIG. 6 simply represents the inner edge of the gussets 96 in the main frame 18.

Referring to FIGS. 7–10, showing a typical front gauge assembly, the main frame and carriage drive provisions are the same as in FIGS. 3–6. Therefore, many of the details thereof are omitted. Features which are different will now be described.

First of all, since the front gauge assemblies may be used to support the workpiece, the frame is provided with a pair of stock support clamp blocks 96 which are secured to the frame by means of a pair of cap screws 97. Each of these blocks receives a stock support rod 98 having a stock support rail 99 fastened to the upper end thereof by means of a cap screw 101. Rail 99 has an inverted U-shaped cross section with a flat top surface 102, a flat and straight inner face 103 and outer face 104. Since the stock support rods 98 are vertically moveable in the stock support clamp blocks, the stock support 99 can be raised so that the upper face 102 thereof is above the upper face 106 of the carriage. When it has been raised or lowered to the desired position, the stock support can be clamped in place by use of the clamp handles 107 that are threadedly received in the stock support clamp blocks. The face 103 of the stock support can be used for squaring purposes. This is facilitated not only by the ability to raise the stock support above the upper face level of the carriage, but also by the fact that the holes receiving the cap screws 101 are elongated in the direction of the arrows 108–109 in FIG. 7. Accordingly, when the cap screws 101 are loosened, the stock support can be shifted in either direction 108 or 109 and at either end, in order to square it up perfectly with the tooling in the press brake. Then the screws can be again tightened to secure the stock support 99 in place.

The carriage has inverted Tee-slots 111 and 112 therein to receive appropriate front gauge fingers or members, depending upon the type of work to be performed.

Because of the fact that the front gauges may be used to support the stock, and because of the fact that their horizontal spacing may need to be varied from job-to-job, some unusual mounting features are employed. Although the mounting face 19 is the same as for the main frame described for the rear gauge, and the mounting is accomplished by a pair of cap screws 113, these cap screws are received in a vertical gauge way 114. This gauge way is received in vertically extending grooves 116 of the speed rail carriage 117. The speed rail carriage is mounted by means of six dual vee carriage guide wheels which are ball bearing mounted to studs secured in the speed rail carriage. These guide wheels are mounted on the vee way bars 119 and 121 received in the way mounting bar 122 which is affixed to the front face of the press brake bed. The way bars 119 and 121 are clamped to the way mounting bar by means of the clamp 123.

Vertical adjustment of the vertical gauge way 114 is accomplished by rotating the handwheel 124 which is secured to the shaft 126 threadedly received at 127 in the vertical gauge way. The shaft 126 is longitudinally confined by the portion 128 between the needle bearing assembly 129 and thrust face 131, the needle bearing assembly abutting a shoulder on the shaft and the thrust face abutting the upper face 132 of the handwheel, the latter being pinned to the shaft by a spring pin 133. The horizontal movement of the speed rail carriage can be prevented by a clamp or jam screw 134 threadedly received in the speed rail carriage and having the knob 136 at the outer end thereof.

Figure 11:
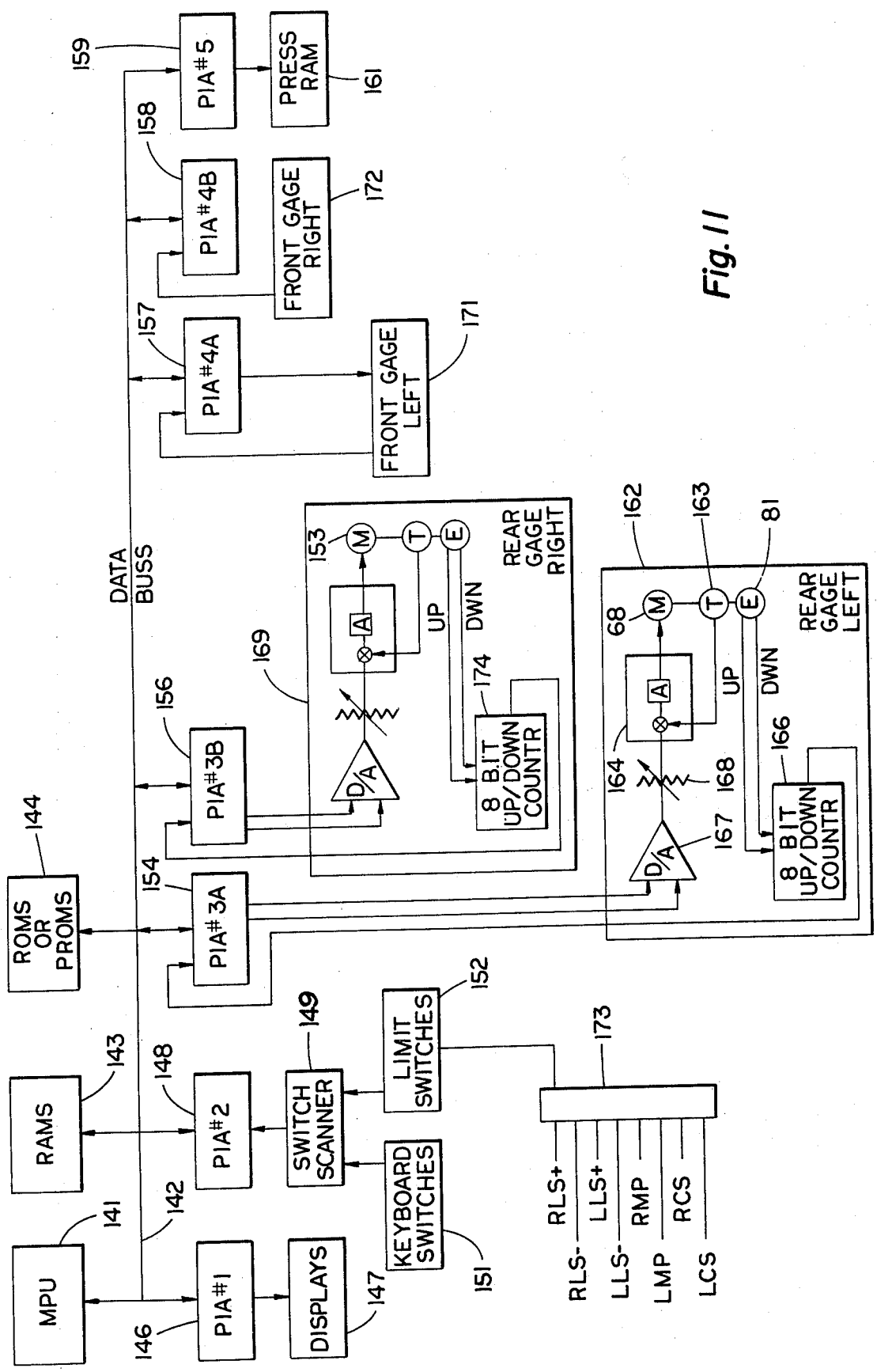
FIG. 11 is a simplified block diagram of the control for the twin screw drive.

Referring to FIG. 11, there is shown a block diagram of the typical embodiment of the present invention as applied to a gauging system for press brakes in which synchronized twin screws are used to drive rear gauges, and synchronized twin screws are used to drive front gauges. The types of operations to be performed on the press brake, methods of manually inputing data and instructions, and digital displays, are described in the publication entitled "Hurco Autobend Owner's Manual for Digital Press Brake Gauge" published by the assignee of this patent application, Hurco Manufacturing Company, Inc., of 6602 Guion Rd., Indianapolis, Ind. 46268. A copy of this publication is enclosed herewith for inclusion in the file of this application. This publication describes the Hurco model S-4 rear gauge which was first sold in 1975 by the assignee of the present application. The model S-4 has a single screw drive in contrast to the apparatus of the present invention which has a twin screw drive.

Referring further to FIG. 11, it has been found advantageous to use the M-6800 "family" of micro-computer components marketed by Motorola, Inc., and described in the "Micro-Computer System Reference Handbook" published in 1974 by Motorola, Inc. Other brands could also be used in the practice of the invention. The microprocessor is at 141 and connected to the data buss 142. Random access memories (RAMS) are represented by block 143, and read-only memories (ROMS) or programmable read-only memories (PROMS) are represented by the block 144.

In the aforementioned Motorola "family" of chips, devices known as peripheral interface adapters (PIA) are employed to connect peripheral components to the central processor unit. In the Hurco model S-4 gauging system, and in the practice of the present invention, they are employed to connect the central processor unit to the incandescent and the LED displays, to the switch scanner for the keyboard and limit switches, and to the motor controller. Referring again to FIG. 11 herein, block 146 represents PIA No. 1 connected to the incandescent and LED panel displays represented by block 147. Block 148 represents PIA No. 2 which is connected to the switch scanner 149 for scanning keyboard switches 151 and various limit switches 152, and any other switches associated with the particular apparatus being controlled.

Since there are two screw drive motors 68 and 153 for driving the rear gauge according to the illustrated embodiment of the present invention shown in FIG. 11, two peripheral interface adapters PIA No. 3A and PIA No. 3B are shown in block 154 and 156 for the left and right rear gauge motors, respectively. For the front gauge, there are also PIA No. 4A and PIA No. 4B in blocks 157 and 158 for the left front gauge drive and control and the right front gauge drive and control, respectively. In block 159 there is a PIA No. 5 which can be used for press brake ram drive and control components in block 161 for a hydraulically driven press brake ram stroke depth control, for example.

Referring further to PIA No. 3A in block No. 154, input and output ports thereof are connected to components in the left rear gauge motor and drive block 162. This includes the screw drive motor itself which has a tachometer 163 on the output shaft thereof and a rotary encoder 81 on the output shaft thereof. The tachometer output is fed back into the motor amplifier at block 164 whereas the output of the rotary encoder is fed to an 8 bit up/down counter 166 whose output is applied to PIA No. 3A. The analog command input to the motor amplifier 164 is derived from a digital to analog converter 167 through an appropriate calibrating resistor or potentiometer 168. The input to the digital to analog converter is from the PIA No. 3A. The same type of arrangement is provided in the block 169 for the rear gauge right motor drive and control and in block 171 for the front gauge left motor drive and control and in block 172 for the right front gauge motor drive and control.

OPERATION

The present invention is applicable not only to gauging systems for punch presses, bending presses or press brakes, shears and the like, but also to the drive of rams for presses, press brakes, or shears, and is also applicable to other equipment. Therefore, the details of gauging will not be described herein, as they are amply set forth in the aforementioned owner's manual and other literature. It should suffice to say here that information regarding dimensions or positions to which the structure is to be driven, is stored in a random access memory (RAM 143, FIG. 11) by previous keyboard entries and is to be accomplished according to the method of the present invention.

In the present example, since it is desirable for the rear gauge bar to always remain parallel to the tooling in a press brake, the target dimension for both gauges will be the same. Therefore a description of the procedure for the motor control for one motor will be described and then related to synchronism with the other motor. For that purpose, the following chart should be helpful for definition and understanding of terms.

| VARIABLES | | is an 8 bit word |
|---|---|---|
| TARGET | | POSITION DESIRED number of .001 inches 0→32000 |
| POSINR | | RIGHT ACTUAL POSITION |
| SNR | | Sign of right command 00 = Plus  FF = Minus |
| COMR | | Value of right command |
| PCOMR | | Past value of right command |
| POSINL | | LEFT ACTUAL POSITION |
| SNL | | Sign of left command |
| COML | | Value of left command |
| PCOML | | Past value of left command |
| PRIOR R | | Past Encoder reading right |
| PRIOR L | | Past Encoder reading left |
| ELR | | Error left to right Absolute value |
| SNLR | | Sign of error left to right |
| COMLIM | | Command limit (VALUF) |

The motor and motor amplifier and tachometer comprise a servomechanism of conventional nature. It is controlled according to a position loop servo program stored in the ROM 144. The microprocessor 141 can implement the program about 400 times per second in accordance with target information data and gauge selection (as between front and rear gauges) information data previously stored in the RAM 143 by entry from keyboard switches in block 151. Instruction cards or tapes or other forms of data input could be employed. These latter two forms of entry are not specifically shown in the specific embodiment illustrated in FIG. 11.

The steps performed in accordance with the SERVO program as applied to the rear gauges, may be described briefly as follows:

1. Position Update (POSUPD)
   a. For each gauge reads the present value of the up/down counter which is driven by the encoder.
   b. Subtracts the prior reading to determine the incremental change which has occurred since the last reading.
   c. Adds the incremental change (which may be a + or −) to the actual position (POSINR & POSINL)
   d. Updates the prior reading for use on the next sampling.

Thus POSINR & POSINL contain the actual instantaneous location of the right and left gauge.

2. Obtain position errors and save them.
   a. Form TARGET-POSINR for the right gauge as a 16 bit value.
   b. Convert this to a sign-magnitude number with the sign in SNR and the magnitude in COMR.
   c. Perform gain change and limiting on COMR as follows:
      1. If COMR less than 0.025 inch, no change.
      2. If COMR between 0.025 and 0.050 inch, divide it by 2.
      3. If COMR between 0.050 and ≈1.0 inch, divide it by 4.
      4. If COMR greater than ≈1.0 inch, set it = 0.256 inch*

*eight bit word maximum value.

d. Perform operation (a),(b),(c) specified above for the left gauge.

Thus COMR and COML are the error values between target and actual.

3. Servo left to right OR right to left (MATCH)
   a. Form single precision sign magnitude of POSINR-POSINL and put into ELR, SNLR.
   b. Fetch sign of largest error COMR or COML. Compare this sign with sign of ELR. If they are the same, select Right axis. If they are different, select Left axis.
   c. If right axis was selected, reverse sign of ELR (i.e. SNLR).
   d. Limit selected command to (0.256 inch−[ELR]).
   e. Do sign magnitude addition of ELR and selected $$COMX \begin{bmatrix} COMR \\ COML \end{bmatrix}$$

and put into COMX.

This has "adjusted" the command of the axis which is ahead, slowing it down in order to drive POSINR=λ POSINL i.e. ELR=0.

4. UPRATE
   a. Each command is compared with its previous value and is allowed to increase only two counts over what it was. No limitation is imposed on decreases.

5. OUTSPD
   a. Each command is outputed through the PIA to the D/A to provide a ± analog velocity command.

6. Motor Control
   The velocity commands control the rate of motion of the gauges. Resulting gauge motion is read by the digital encoders.

7. Loop to 1.

Now referring more specifically to FIG. 11 with reference to paragraph 1(a) above, encoder 81 drives the eight-bit up/down counter up or down, depending upon which direction the motor axis is rotating to drive the gauge toward or away from the press brake tooling. The count is read into an input port of the peripheral interface adapter 3A for temporary storage in the computer. In this example, the rotary encoder produces a pulse for each 0.001 of an inch of travel of the ball nut on the lead screw. Therefore each increment of the counter represents 0.001 of an inch of travel.

The output from the computer is applied through the PIA No. 3A to the digital to analog converter 167 producing an output command through the calibrating device 168 to the motor amplifier. Typically this command is an analog voltage from minus 5 volts to plus 5 volts. The sign of the output depends upon the sign applied to the converter 167 from the PIA No. 3A as determined by the direction of motion needed.

Some specific limit switches are shown in block 173 connected to block 152 in FIG. 11, and should be understood to be included in block 152. They are only shown here to indicate that for the left and right rear gauges there are inputs from limit switches such as RLS+ and RLS− for the right gauge, and RCS which is the center switch for the right gauge, and LLS+ and LLS− and LCS for the extreme limit and center limit switches for the left gauge. Also the RMP represents the right marker pulse input from the encoder and LMP represents the left marker pulse input from the encoder. For the left rear gauge, the LLS+ could be switch 86; LLS− could be switch 88; and LCS could be switch 87. The left marker pulse comes from the encoder 81. It should be recognized that if it were desired to provide another motor and lead screw to drive still another carriage for the rear gauge, or where there would be devices other than gauges mounted to or driven by nuts on motor-driven lead screws, additional limit switches and marker pulse inputs could be provided for cooperation with the additional motor, drive, counter and other components such as in block 162 for each additional motor and screw. Some changes in program details would be needed, but would be of a type well within the skill of the art. Therefore the above-described program operation to produce the velocity commands for the motor controllers such as 164 in FIG. 11 can be expanded to drive more than two motors. The sign of the velocity command designates the direction in which the motor is to move, and the level is proportional to the velocity at which the gauge is to be moved. An example of a suitable motor controller is the Aerotech Model No. 4020 servo controller manufactured by Aerotech, Inc. of Pittsburgh, Pa.

In the use of the apparatus, assuming that it is applied to gauging, it can be placed in a calibrate mode in which the motors 68 and 153 drive the gauges until their respective carriages are so positioned as to establish coincidence of the left center switch signal with the left marker pulse and coincidence of the right center switch signal with the right marker pulse. This provides the reference position for the carriage with respect to the frame. The particular dimensional read-out in the display 147 of that dimension is established by the adjustment of the horizontal support arm for the gauge with respect to the carriage, so that when the dimensional read-out is 4 inches, this signifies that the workpiece abutting face of the gauge bar is 4 inches from the center line of the punch in the press brake. Therefore, any target dimension which has been keyed in on the keyboard and stored in a RAM, will be sought by the motors for the gauge bar at the correct time for the particular bend to be made in the workpiece.

1. Position Update

Assuming now that the motors are driving the gauge toward a target dimension, the servo program procedure goes through the steps outlined above. Assuming that it is the rear gauge that is being driven for the "position update" algorithm outlined above, the computer reads the values of the counters 166 and 174 and stores the information temporarily. It then subtracts the counts stored in the prior scan to determine the incremental change in content of the counters. The incremental change indicates how far the carriage driven by that particular motor has moved within the sampling time. It then adds the incremental change to a variable in the computer which is known as actual position right (POSINR) for the right-hand gauge, and the incremental change noted from the left counter is added to the variable for the left gauge to provide the actual position left (POSINL) for the left gauge. Then the stored count from the previous sample is updated to the present sample for use on the next sampling. The absolute values of POSINR and POSINL may have been initialized at, for example, 12 inches, which is the position halfway between end positions on a 24-inch stroke carriage, and at which the registry of the marker pulse and center switch is achieved. The position update algorithm provides a continuous updating of gauge position so that if, for any reason, the two carriages are not moving at the same rate, the computer will be provided with the information as actual position of each. The algorithm provides actual instantaneous location of the right and left gauges, regardless of whether they were moved by the drive motor or by hand or otherwise. This leads to the second algorithm outlined above which obtains and stores position error.

2. Position Error, Obtain and Store

The position error for the right-hand gauge with respect to the target position is obtained by subtracting the POSINR value from the TARGET value previously keyed into the controller keyboard 151 manually, and forming the result as a 16-bit value. This is converted to a sign-magnitude number with the sign in the SNR register and the magnitude in the COM register. The value of this number tells how far the gauge is from the target dimension and the sign tells whether it is at a dimension greater or less than the target dimension.

Position loop servo gain change and limiting are employed. The maximum command word is only an 8-bit word. Thus if the position error is greater than 1 inch, the velocity command COMR value is set at the maximum value of the eight-bit word for rapid traverse. At position errors less than 1 inch, the velocity command value is decreased proportionally. Maximum fixed gain is applied when the gauge is very close (0.010 to 0.020 inches) to the target position. For position errors greater than 0.025 inches, the gain applied to COMR is divided in accordance with the rules set forth in the outline above, such that the effect is that the servo is tightened as the COMR approaches 0. Since the COMR value is the one which is sent to the motor control, its change in value determines the slowdown of the gauge as the gauge approaches the target. The slowdown occurs within a 1-inch interval and is governed by the rules set out above in order to avoid an abrupt impact-type stop. After the operations of steps 2(a), 2(b), and 2(c) outlined above are performed, the COMR and COML are velocity command values derived from the calculated position error values between target position and actual position, with appropriate gain changes and limiting applied to them. These are the commands applied to the digital to analog converters for the right and left gauges, respectively, after checking and possible modification by MATCH, outlined below.

3. Servo left-to-right or right-to-left (MATCH)

The algorithm #3 outlined above, which is referred to as the "match" routine, servos the left gauge motor control to the right, or the right to the left, whichever is farther from the target dimension. It servos the gauge nearer the target dimension to the gauge which is farther from the target dimension. This is the significant thing done to keep them moving together while they are moving toward the target position. In the algorithm #3 step (b), by fetching the sign of the largest error, it is determined which gauge is "ahead" of the other in the movement toward the target. Thereafter, until the gauges have arrived at the target dimension, that gauge which was ahead is slaved to the one which was behind, but not so much so that it gets behind. The sign reversal in step 3(c) is simply for convenience in the computer. The command limitation on step 3(d) avoids the slowdown of the leading gauge from ever causing it to get behind the gauge which it was behind at the time of the formation of the ELR, SNLR word and signal designating which gauge would serve as the master during the approach to the target position. The gauge which was behind is permitted to run at the maximum COMR or COML value until it reaches a point within one inch of the target, whereupon the slowdown occurs as described above with reference to algorithm #2. The COMX command arrived at in step 3(d) will always be a slowdown signal to slow down that gauge which was closer to the target position.

It is important to recognize that, although the controller will normally seek the target position for both gauges, if it happens that one gauge is stopped abruptly short of the target position, or having arrived at target position, is knocked off the target position, beyond the capability of its motor to control such movement, the other gauge will be preferentially maintained within one eighth inch of the one gauge. That is to say that the higher priority objective of the controller is to maintain the gauges within one eighth inch of each other (ELR less than 0.125 inches) than it is to reach or hold the target position.

4. Uprate

With regard to the uprate limitation outlined at #4 above, for a normal gauge movement to a new target dimension for the next bond in sequence, or if by some accident or otherwise, the target dimension is suddenly changed substantially, or if the gauge is bumped off the target position, the COMR and COML will not instantly rise to full value, but rather will increase corresponding to a counter change of two counts for each scan of the loop, thus avoiding an excessive voltage surge at the controller. In this way, a reasonable acceleration rate is achieved.

Figure 12:
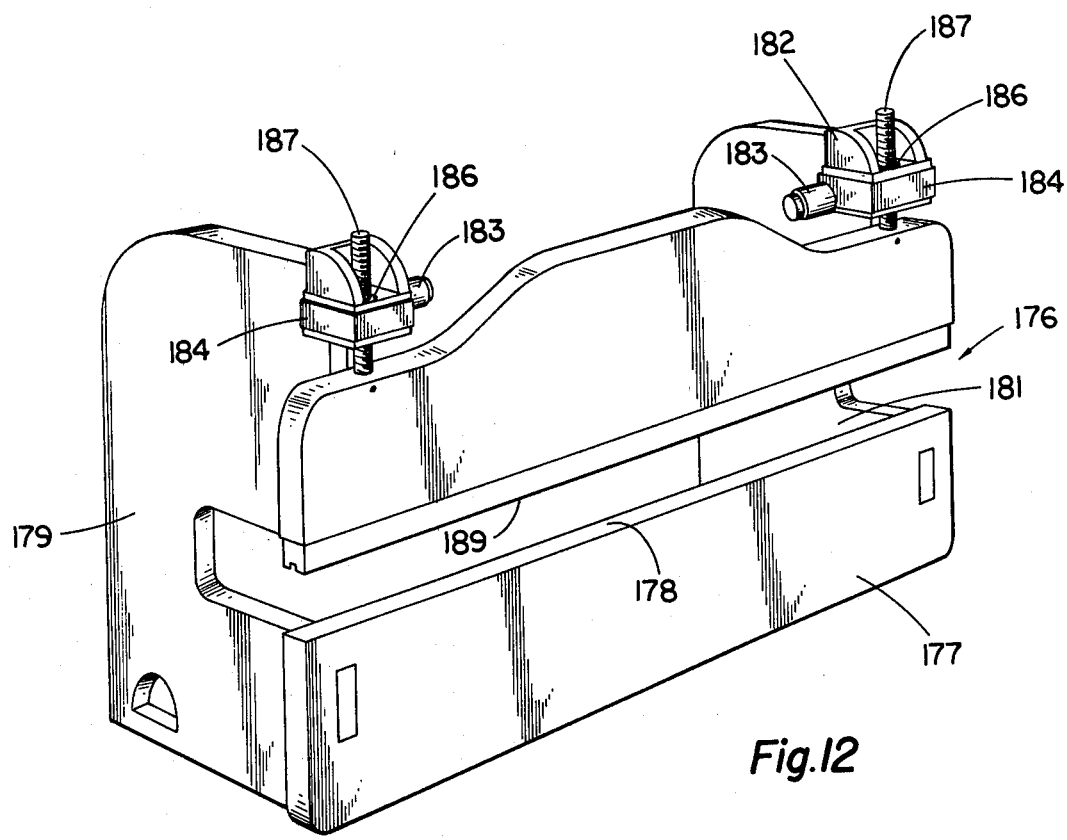
FIG. 12 is a simplified perspective view of a new overdriven-type press brake employing synchronized motors driving the ram by means of a pair of drive screws.

Referring now to FIG. 12, there is shown in perspective a new type of press brake 176 having bed 177 with an upper edge thereof at 178 to which tooling can be secured. C-shaped side frames 179 and 181 are affixed to the bed and provide supports for drive mounting brackets 182 at the upper front edges thereof. These brackets support drive assemblies including a D.C. motor 183 connected to the gear box 184 and driving a ball nut 186 which receives a vertically extending lead screw 187. The two lead screws support the opposite ends of the RAM 188 to which the upper tooling is mounted at 189. The motors 183 thereby serve to drive the ram up and down by rotating the ball nuts which thereby drive the lead screws. The operation of the motors is synchronized in the same manner as has been described above with reference to FIG. 11 for driving gauges.

Figure 13:
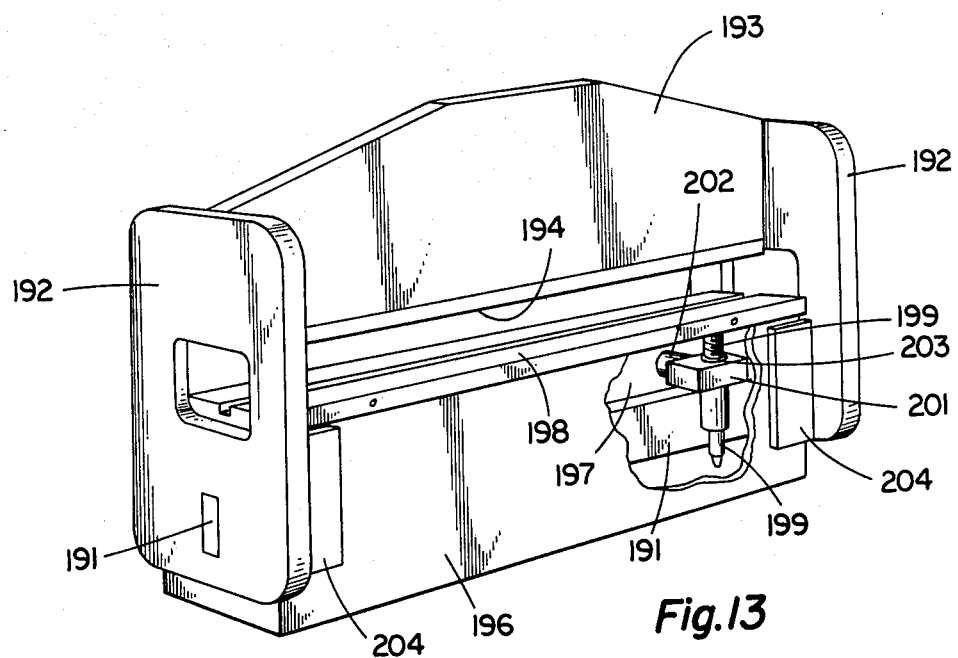
FIG. 13 is a simplified perspective view of a new underdriven-type press brake employing synchronized motors driving the workpiece support by means of a pair of drive screws.

Referring now to FIG. 13, an underdriven-type of press brake is shown wherein a cross frame 191 is affixed to side frame uprights 192 to which an upper cross member 193 is affixed. The upper tooling is fastened to the lower edge of the upper cross member at 194.

Two horizontally spaced and parallel outer and stationary bed plates 196 and 197 are affixed together and to the platen or tool-holder member 198 to which the lower tooling is affixed. A pair of ball lead screws such as that shown at 199 is affixed to the platen, one such screw being located at each end. In a manner similar to that described with reference to FIG. 12, a gear box 201 secured to each end of the cross frame 191, has a D.C. drive motor 202 secured thereto and driving a ball nut 203 therein. The ball nuts are received on the lead screws and the drive thereof serves to drive the cross frame 191 to which the gear boxes are affixed, and thereby the upper cross member 193 up and down with the gibs 204 secured to the side frame uprights at the front and rear of the press brake guided by plates 196 and 197. The gibs thereby serve to guide the upper cross beam assembly on the front and rear stationary bed plates as the upper cross beam or ram is driven up and down by the drive motors. The motors are synchronized in the same manner as described above with reference to FIG. 11 for gauge drive motors, to be certain that the opposite ends of the frames 191 and 193 are driven in unison.

While there have been described above the principles of this invention in connection with specific apparatus, it is to be clearly understood that this description is made only by way of example and not as a limitation in the scope of the invention.

We claim:

1. A gauging apparatus for presses and the like comprising:
   frame means having first and second lead screws therein;
   first and second screw drive motors, said first motor being coupled to said first screw for driving said first screw, and said second motor being coupled to said second screw for driving said second screw;
   first and second gauge mounting carriages coupled to said first and second screws respectively and linearly drivable thereby;
   control means coupled to said motors for controlling the drive of said motors and thereby controlling drive of said screws, and control means including electric synchronizing means for causing said motors to drive said carriages in synchronism,
   said control means including a microprocessor.

2. The apparatus of claim 1 wherein:
   said frame means include a pair of frames, each frame having a pair of horizontally-spaced, longitudinally-extending carriage ways thereon, each way having a running edge of V-shaped cross section;
   said carriages each having grooved rollers thereon mounted for rotation thereon and engaging the said running edge of one of the ways of the respective frame whereby said carriage is supported and guided as it is driven by one of said lead screws.

3. The apparatus of claim 2 and further comprising:
   a pair of ball nuts and connectors, one of said ball nuts being on each of said lead screws and having one of said connectors secured thereto;
   a pair of U-shaped drive yokes, one yoke for each carriage, each of said yokes being secured at its bottom to one of said connectors and extending outwardly and then upwardly therefrom on around the one of said frames having therein the lead screw driving the said one connector, the upper ends of each yoke being affixed to one of said carriages.

4. The apparatus of claim 2 and further comprising:
   two pairs of posts, one pair of posts being affixed to each of said carriages and projecting upwardly therefrom;
   a pair of horizontal support brackets, each bracket being mounted to the posts of one pair of said pairs of posts and vertically movable thereon; and
   two height adjusting screws mounted to said posts and operable to change the height of said brackets.

5. The apparatus of claim 4 and further comprising:
   a pair of horizontal support rods, each clamped in one of said horizontal support brackets and, upon unclamping, relatively movable therein parallel to the running edges of said ways,
   and a pivoting gauge bar extending between and pivotally mounted to said support rods to pivot about a horizontal axis.

6. The apparatus of claim 2 and further comprising:
   means on said carriages for locating material to be fed into the press or the like; and
   vertical guideways extending transverse to the direction of extension of said carriage ways, the rear end of each of said frames being affixed to one of said vertical guideways,
   a front mounting rail securable to a press or the like,
   upper and lower horizontally extending carriage support guideways affixed to said rail,
   a pair of front mounting speed carriages having grooved rollers thereon received and guidingly supported on said guideways for horizontal movement of said speed carriages side-to-side on the press or the like,
   said vertical guideways being received in said speed carriages and being vertically movable and guided in said speed carriages,
   and means on said speed carriages and vertical guideways for raising and lowering said vertical guideways.

7. The apparatus of claim 6 wherein:
   said means for raising and lowering include height adjustment screws, one of said screws being on each of said speed carriages and threaded into said vertical guideway and each having a handwheel on said screw for convenient manual rotation thereof to raise and lower the frames and thereby raise and lower the material locating means.

8. The apparatus of claim 6 and further comprising a combined stock support arm and side squaring bar member clamped to at least one of said frames and, by unclamping, vertically adjustable on the frame to which the member is mounted.

9. The apparatus of claim 1 and further comprising:
   additional frame means having third and fourth lead screws therein;
   third and fourth screw drive motors, said third motor being coupled to said third screw for driving said third screw, and said fourth motor being coupled to said fourth screw;
   third and fourth gauge mounting carriages coupled to said third and fourth screws respectively and linearly drivable thereby;
   said control means being coupled to said third and fourth motors for controlling the drive of said third and fourth motors and thereby controlling the drive of said third and fourth screws, said control means including electric synchronizing means for causing said third and fourth motors to drive said third and fourth carriages in synchronism.

10. The apparatus of claim 9 wherein:
    said control means include four motor controlling servo amplifiers one for each of said motors.

11. The apparatus of claim 9 and further comprising:
    a press brake bed, the first mentioned frame means being mounted to the rear of said bed for supporting a rear gauge, and said additional frame means being mounted to the front of said bed, for supporting a front gauge.

12. The apparatus of claim 11 wherein:
    the first mentioned of said frame means, and said additional frame means each include a pair of frames, each frame having a pair of horizontally-spaced, longitudinally-extending carriage ways thereon, each way having a running edge of V-shaped cross section;

said carriages each having grooved rollers thereon mounted for rotation thereon and engaging the said running edge of one of the ways of the respective frame whereby said carriage is supported and guided as it is driven by one of said lead screws.

13. The apparatus of claim 12 and further comprising: drive nuts on said screws;

U-shaped drive yokes connected to said drive nuts, each of said yokes having a central bottom portion connected to one of said nuts and having arms extending outwardly therefrom and then upwardly around the one of said frames having the nut receiving screw therein, with the upper ends of the arms of the yoke being attached to that one of said carriages which is to be driven by said nut.

14. The apparatus of claim 13 and further comprising: rear gauge means mounted to said first and second carriages, and front gauge means mounted to said third and fourth carriages.

15. Gauging apparatus for presses and the like comprising:

an elongated housing;

a drive screw in said housing and substantially enclosed by said housing;

a drive motor coupled to said screw for driving said screw;

a pair of parallel, longitudinally-extending carriage ways secured to said housing, each way having a running edge of V-shaped cross section;

a gauge mounting carriage coupled to said screw for linear drive by said screw, said carriage having grooved rollers thereon engaging at least one of said running edges, whereby said carriage is supported and guided as it is driven by said screw.

16. The apparatus of claim 15 and further comprising: gauge means mounted on said carriage.

17. The apparatus of claim 15 and further comprising: vertical guideway means extending transverse to the direction of extension of said carriage ways, the rear end of said housing being affixed to said vertical guideway means, a front mounting rail securable to a press or the like, upper and lower horizontally extending carriage support guideways affixed to said rail, a speed carriage having grooved rollers thereon received and guidingly supported on said guideways for horizontal movement of said speed carriage sideways on the press or the like, said vertical guideway means being received in said speed carriage and vertically movable and guided in said speed carriage, and means on said speed carriage and on said vertical guideway means for raising and lowering said vertical guideway means and thereby raising and lowering said housing.

18. The apparatus of claim 15 wherein:

said housing is a downwardly opening casting; and said carriage ways are affixed to the top of the casting and the said running edges thereof are horizontally spaced and face outwardly away from each other.

19. The apparatus of claim 18 and further comprising: a nut threaded on said drive screw; and strap means extending downward from said carriage and under said housing and fixed to said nut in said housing to thereby couple said carriage to said screw.

* * * * *

UNITED STATES PATENT AND TRADEMARK OFFICE
CERTIFICATE OF CORRECTION

PATENT NO. : 4,084,424
DATED : April 18, 1978
INVENTOR(S) : Gerald V. Roch; Chris L. Hadley It is certified that error appears in the above-identified patent and that said Letters Patent are hereby corrected as shown below:

In column 8, line 25, after the word "limit" for "(VALUF)" read "(VALUE)".

In column 13, line 29, after the word "screws," and before the word "control", for "and" read "said".

In column 13, line 50, after the word "therefrom" and before the word "around" delete "on".

Signed and Sealed this

Seventeenth Day of October 1978

[SEAL]

Attest:

RUTH C. MASON
Attesting Officer

DONALD W. BANNER
Commissioner of Patents and Trademarks